(12) United States Patent
Yu

(10) Patent No.: US 11,743,368 B2
(45) Date of Patent: Aug. 29, 2023

(54) SCREEN COMPONENT, MOBILE PHONE AND MOBILE DEVICE

(71) Applicant: Gree Electric Appliances, Inc. of Zhuhai, Guangdong (CN)

(72) Inventor: Zhe Yu, Guangdong (CN)

(73) Assignee: Gree Electric Appliances, Inc. of Zhuhai, Zhuhai (CN)

( * ) Notice: Subject to any disclaimer, the term of this patent is extended or adjusted under 35 U.S.C. 154(b) by 81 days.

(21) Appl. No.: 17/441,583

(22) PCT Filed: Dec. 27, 2019

(86) PCT No.: PCT/CN2019/129040
§ 371 (c)(1),
(2) Date: Sep. 21, 2021

(87) PCT Pub. No.: WO2020/224278
PCT Pub. Date: Nov. 12, 2020

(65) Prior Publication Data
US 2022/0201107 A1 Jun. 23, 2022

(30) Foreign Application Priority Data
May 6, 2019 (CN) .......................... 201910372520.8

(51) Int. Cl.
*H04M 1/02* (2006.01)
(52) U.S. Cl.
CPC ......... *H04M 1/0268* (2013.01); *H04M 1/021* (2013.01)
(58) Field of Classification Search
CPC .... H04M 1/0268; H04M 1/021; H04M 1/026; H04M 1/0266
See application file for complete search history.

(56) References Cited

U.S. PATENT DOCUMENTS 10,915,146 B2 * 2/2021 Zhao ................. G06F 1/1652
2005/0041012 A1 * 2/2005 Daniel ................ G06F 1/1601
345/156
(Continued)

FOREIGN PATENT DOCUMENTS

CN 107911514 A 4/2018
CN 207782885 U 8/2018
(Continued)

OTHER PUBLICATIONS

Zhang et al, translation of CN 108924296 A, Nov. 30, 2018 (Year: 2018).*
(Continued)

*Primary Examiner* — Lewis G West
(74) *Attorney, Agent, or Firm* — McAndrews, Held & Malloy, Ltd.

(57) ABSTRACT

Provided are a screen component, a mobile phone, and a mobile device. The screen component includes: a screen body, wherein a presentation area is provided on an end of the screen body; and a driving mechanism, wherein the driving mechanism is configured to drive the screen body to switch between a first position and a second position. While the screen body is arranged in the first position, the presentation area is located within a range of a window, and a front-mounted mechanism is able to expose from the presentation area; and while the screen body is arranged in the second position, the screen body takes up the window, and the front-mounted mechanism is shielded by the screen body.

8 Claims, 4 Drawing Sheets

(56) References Cited

U.S. PATENT DOCUMENTS

| | | | | |
|---|---|---|---|---|
| 2008/0086925 | A1* | 4/2008 | Yang | H04M 1/0268 40/610 |
| 2008/0198540 | A1* | 8/2008 | Bemelmans | H04M 1/0202 361/679.06 |
| 2009/0064055 | A1* | 3/2009 | Chaudhri | G06F 3/0482 715/863 |
| 2013/0021734 | A1* | 1/2013 | Singhal | G06F 1/1649 361/679.04 |
| 2015/0047796 | A1* | 2/2015 | Peng | G09F 11/34 160/323.1 |
| 2015/0220118 | A1* | 8/2015 | Kwak | G06F 3/1438 345/520 |
| 2015/0319294 | A1* | 11/2015 | Sudhir | H04W 12/08 455/411 |
| 2016/0034047 | A1* | 2/2016 | Lee | H04M 1/72427 345/156 |
| 2017/0011714 | A1* | 1/2017 | Eim | G06F 1/1677 |
| 2019/0012008 | A1* | 1/2019 | Yoon | G06F 1/1652 |
| 2019/0025691 | A1* | 1/2019 | Abe | G03B 21/60 |
| 2020/0022268 | A1* | 1/2020 | Zuo | G06F 1/1681 |
| 2021/0056874 | A1* | 2/2021 | Morin | G06F 1/1601 |

FOREIGN PATENT DOCUMENTS

| | | |
|---|---|---|
| CN | 108924296 A | 11/2018 |
| CN | 208820832 U | 5/2019 |
| CN | 110166590 A | 8/2019 |

OTHER PUBLICATIONS

International Search Report, dated Jul. 12, 2017, in International application No. PCT/CN2017/079716, filed on Apr. 7, 2017.

\* cited by examiner

SCREEN COMPONENT, MOBILE PHONE AND MOBILE DEVICE

CROSS-REFERENCE TO RELATED APPLICATIONS

The disclosure is a national stage application of International Patent Application No. PCT/CN2019/129040, which was filed on Dec. 27, 2019. The present disclosure claims priority to Chinese patent application No. 201910372520.8, filed on May 6, 2019 and titled "Screen component, mobile phone and mobile device", the disclosure of which is hereby incorporated by reference in its entirety.

TECHNICAL FIELD

The disclosure relates to the field of mobile devices, and in particular to a screen component, a mobile phone and a mobile device.

BACKGROUND

In order to provide users with better usage experience, mobile devices such as a mobile phone try to increase a screen-to-body ratio of the device as much as possible. Many mobile phones use a "notch"-type design (such as iPhone X) to increase the screen-to-body ratio of the mobile phones. However, this mode is used to increase the screen-to-body ratio, the screen-to-body ratio of the device is also fixed, and may not be changed during use.

SUMMARY

Some embodiments of the disclosure provide a screen component, a mobile phone, and a mobile device, and may improve the problem that the screen-to-body ratio of related mobile devices may not be changed while a "notch"-type design is used.

The screen component provided by some embodiments of the disclosure is implemented as follows. A screen component is disposed on a window of a mobile device, and a front-mounted mechanism is disposed in the window of the mobile device, the screen component includes a screen body and a driving mechanism. An end of the screen body is provided with a presentation area. The driving mechanism is configured to drive the screen body to switch between a first position and a second position. While the screen body is arranged in the first position, the presentation area is located within a range of the window, and the front-mounted mechanism is able to expose from the presentation area. And while the screen body is arranged in the second position, the screen body takes up the window, and the front-mounted mechanism is shielded by the screen body.

In some embodiments of the disclosure, the screen body includes a flexible screen.

In some embodiments of the disclosure, the flexible screen has a first end and a second end which are provided oppositely, and the first end and the second end of the flexible screen are both wound on the driving mechanism.

In some embodiments of the disclosure, the presentation area is disposed in a middle position of the first end.

In some embodiments of the disclosure, the driving mechanism includes a first rotating shaft, a second rotating shaft, and a third rotating shaft, wherein the first end of the flexible screen is wound on the first rotating shaft and the second rotating shaft, and the first rotating shaft and the second rotating shaft are disposed coaxially and are respectively located on two sides of the presentation area; and the second end of the flexible screen is wound on the third rotating shaft.

In some embodiments of the disclosure, the presentation area includes a gap.

In some embodiments of the disclosure, the presentation area includes a transparent layer.

A mobile phone, the mobile phone includes any one of the above screen components.

A mobile device, the mobile device includes any one of the above screen components.

The beneficial effect of the screen component, the mobile phone, and the mobile device provided by the embodiments of the disclosure is that the screen component obtained through the above design in the embodiments of the disclosure may be installed on the mobile device such as the mobile phone. While the mobile device provided with the screen component provided by the embodiments of the disclosure is in use, the screen body is controlled to switch between the first position and the second position according to requirements. While there is no need to use the front-mounted mechanism (such as a camera), the screen body is controlled to be in the second position. At this time, the screen body fills the window of the mobile device, the front-mounted mechanism is shielded, so that the screen-to-body ratio of the mobile device reaches the highest. While the front-mounted mechanism needs to be used, the screen body is controlled to move and switch to the first position. The presentation area of the screen body is moved to the range of the window and corresponds to a position of the front-mounted mechanism. A user observes the front-mounted mechanism from the presentation area, and the front-mounted mechanism works normally. At this time, because a part of the window of the mobile device is occupied by the presentation area and the front-mounted mechanism, the screen-to-body ratio is decreased compared to the screen-to-body ratio while the screen body is arranged in the second position, but a normal operation of the front-mounted mechanism is guaranteed. It may be seen that the screen component provided by the embodiments of the disclosure changes the screen-to-body ratio of the mobile device through controlling the screen body to switch between the first position and the second position while in use, and while the front-mounted mechanism needs to be used, the normal work of the front-mounted mechanism may not be affected. The user is able to switch the screen-to-body ratio of the mobile device according to the requirements, so a user experience is greatly improved. At the same time, because the screen fills the entire window while the screen body is arranged in the second position, the problem of the "notch"-type design that reduces the aesthetic degree is avoided.

BRIEF DESCRIPTION OF THE DRAWINGS

In order to more clearly describe technical schemes of implementation modes of the disclosure, drawings that need to be used in the implementation modes are briefly introduced below. It should be understood that the following drawings only show some embodiments of the disclosure, and thus it should not be regarded as limitation to a scope. Those of ordinary skill in the art may also obtain other related drawings according to these drawings under the precondition without creative work.

Figure 1:
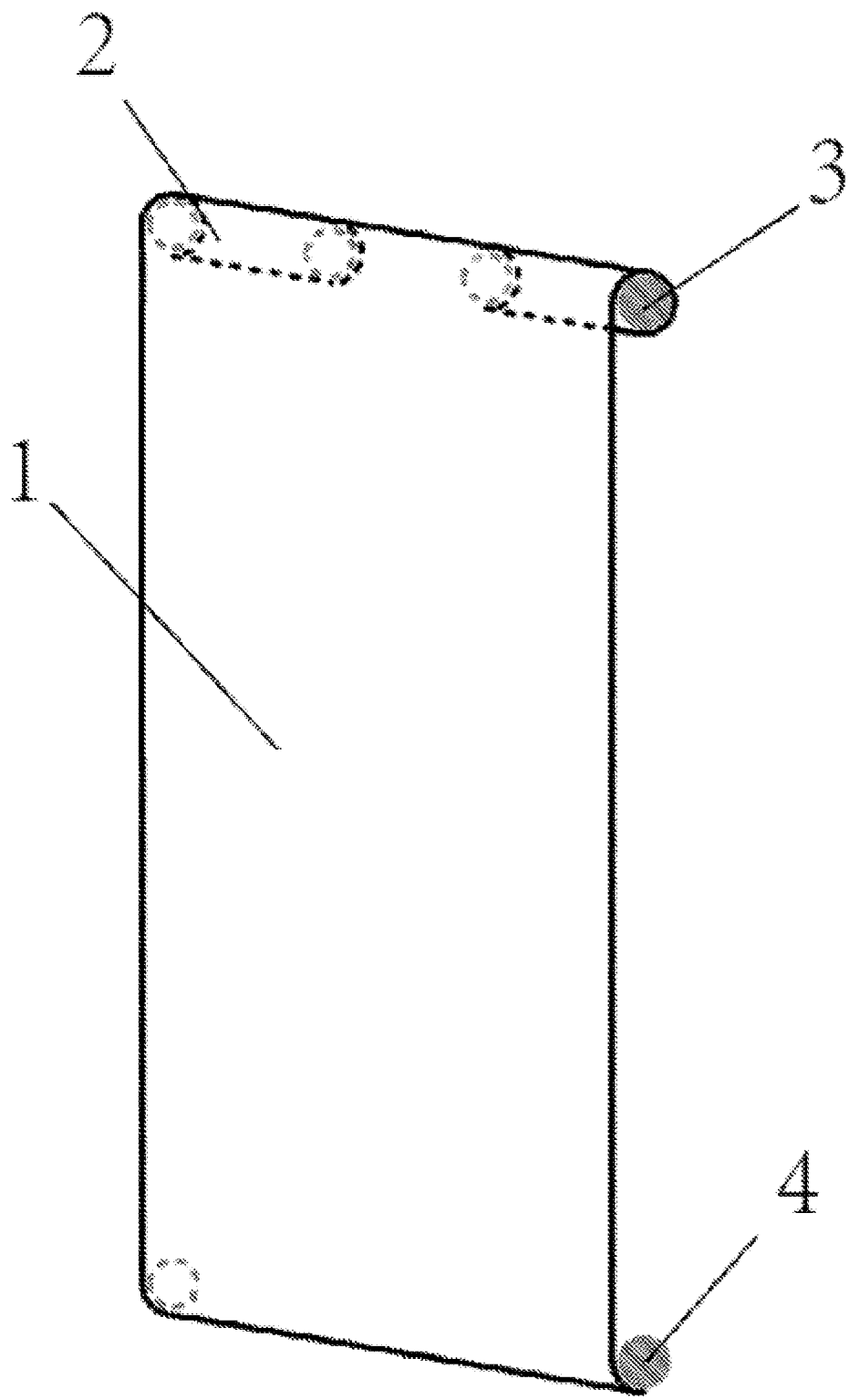
FIG. 1 is a structure schematic diagram of a screen component provided by some embodiments of the disclosure (a screen body is arranged in a second position).
Figure 2:
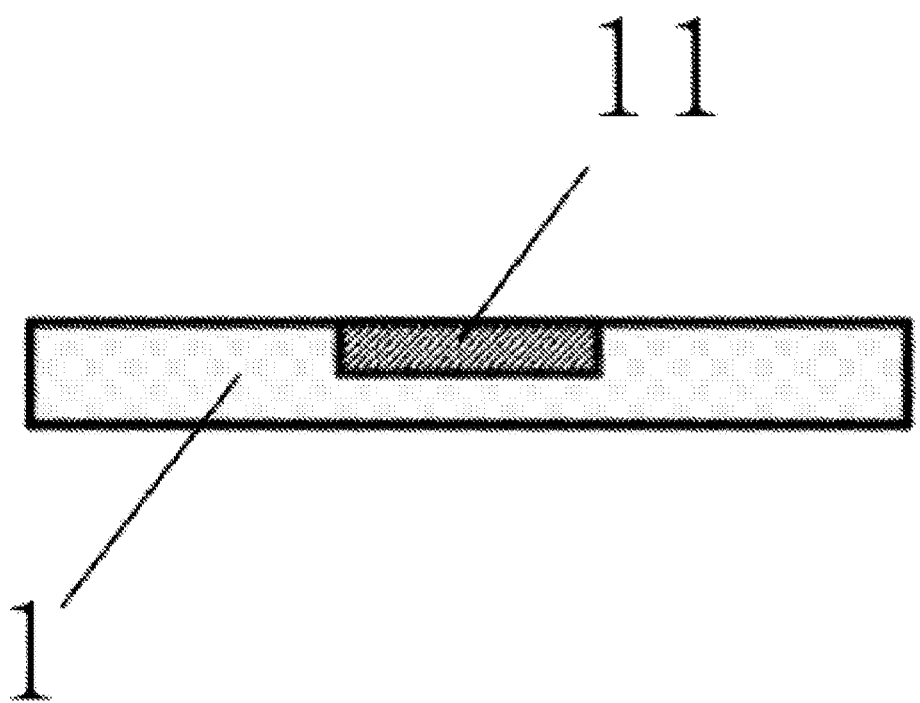
FIG. 2 is a top view of a screen component provided by some embodiments of the disclosure (the screen body is arranged in the second position).

Icons: Screen body 1, Presentation area 11, First rotating shaft 2, Second rotating shaft 3, and Third rotating shaft 4.

DETAILED DESCRIPTION OF THE EMBODIMENTS

In order to make the objectives, technical schemes, and advantages of implementation modes of the disclosure clearer, the technical schemes in the embodiments of the implementation are described clearly and completely below in combination with the drawings in the embodiments of the implementation. Apparently, the described implementation modes are a part of the implementation modes of the disclosure, but not all of the implementation modes. Based on the implementation modes in the disclosure, all other implementation modes obtained by those of ordinary skill in the art under the precondition without creative work shall fall within a scope of protection of the disclosure. Therefore, the following detailed descriptions of the implementation modes of the disclosure provided in the drawings are not intended to limit the scope of the claimed application, but merely represent the selected implementation modes of the disclosure.

In the description of the disclosure, it should be understood that orientation or position relationships indicated by the terms "center", "longitudinal", "transverse", "length", "width", "thickness", "upper", "lower", "front", "back", "left", "right", "vertical", "horizontal", "top", "bottom", "inner", "outer", "clockwise", "counterclockwise" and the like are based on the orientation or position relationships shown in the drawings, and are only for the convenience of describing the embodiments of the disclosure and simplifying the description, and do not indicate or imply that the indicated device or element must have a specific orientation, and be constructed and operated in the specific orientation. Therefore, it may not be understood as the limitation to the disclosure.

In addition, the terms "first" and "second" are only used for the description, and may not be understood as indicating or implying relative importance or implicitly indicating the number of indicated technical features. Thus, the features defined with "first" and "second" explicitly or implicitly include one or more of these features. In the description of the disclosure, "plurality" means two or more than two, unless otherwise specifically defined.

In the disclosure, unless otherwise clearly specified and defined, the terms "installed", "linked", "connected", "fixed" and the like should be understood in a broad sense, for example, fixed connection, or detachable connection, or integrated connection; mechanical connection, or electrical connection; direct connection, or indirect connection through an intermediate medium, or internal communication between two elements or interaction relationship between two elements. For those of ordinary skill in the art, it is necessary to understand the specific meaning of the above terms in the disclosure according to specific circumstances.

In the disclosure, unless otherwise clearly specified and defined, the first feature "on" or "under" the second feature includes direct contact between the first and second features, or includes that the first and second features do not directly contact and the contact is through another feature between them. Moreover, the first feature "upon", "above" and "on" the second feature includes that the first feature is directly above and obliquely above the second feature, or it simply means that the level height of the first feature is higher than that of the second feature. The first feature "beneath", "below" and "under" the second feature includes that the first feature is directly below and obliquely below the second feature, or it simply means that the level height of the first feature is smaller than that of the second feature.

Please refer to FIG. 1-FIG. 4, some embodiments of the disclosure provide a screen component, the screen component is disposed on a window of a mobile device, and a front-mounted mechanism is disposed in the window of the mobile device. In actual applications, the mobile device includes a mobile phone, a tablet computer or a portable playback device and the like. In some embodiments, the window of the mobile device is regarded as a screen area of the mobile phone. The front-mounted mechanism is any front-mounted mechanisms on the mobile phone, such as a front-mounted camera, a photosensitive sensor or an infrared sensor and the like, it is analogously regarded as a component in a "notch" area of the mobile phone.

The screen component provided by some embodiments of the disclosure includes a screen body 1 and a driving mechanism. An end of the screen body 1 is provided with a presentation area 11. The driving mechanism is configured to drive the screen body 1 to switch between a first position and a second position.

Figure 3:
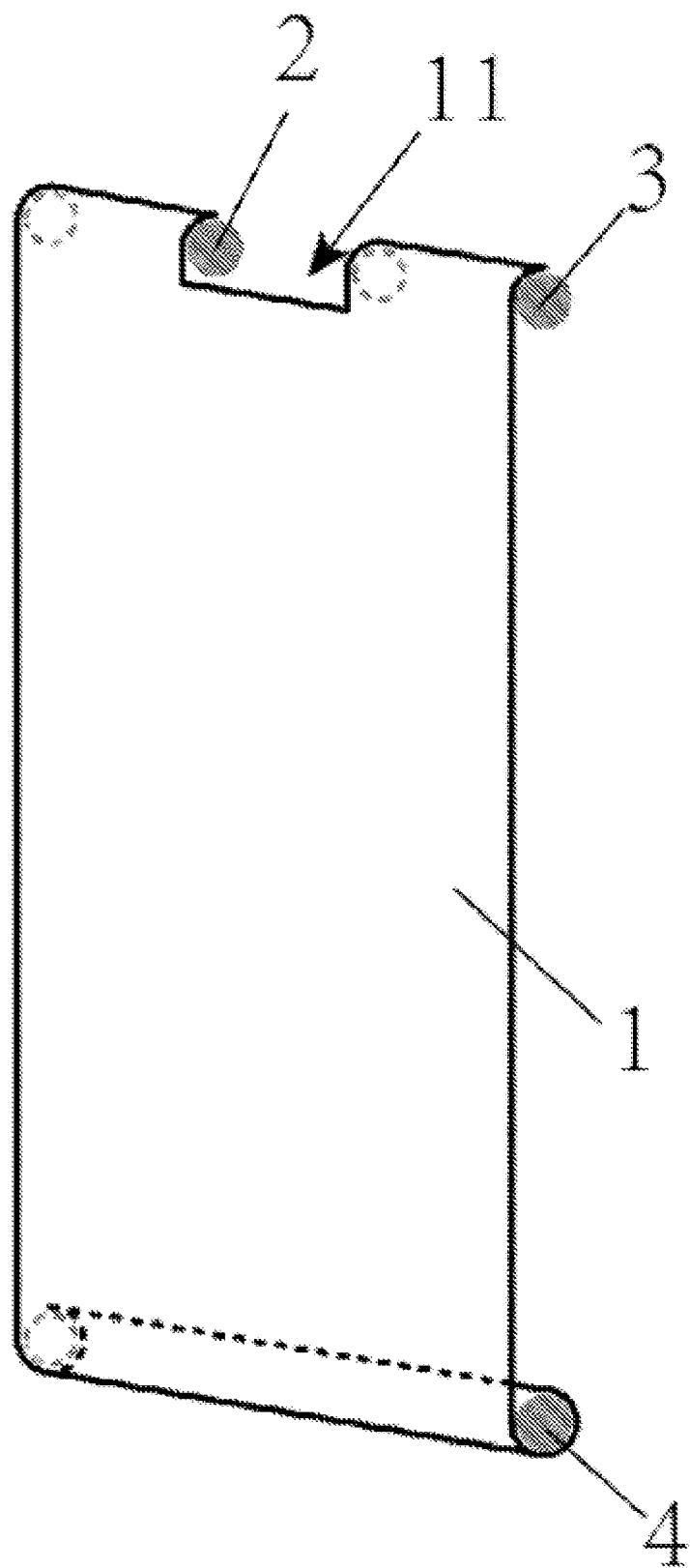
FIG. 3 is a structure schematic diagram of a screen component provided by some embodiments of the disclosure (the screen body is arranged in a first position).
Figure 4:
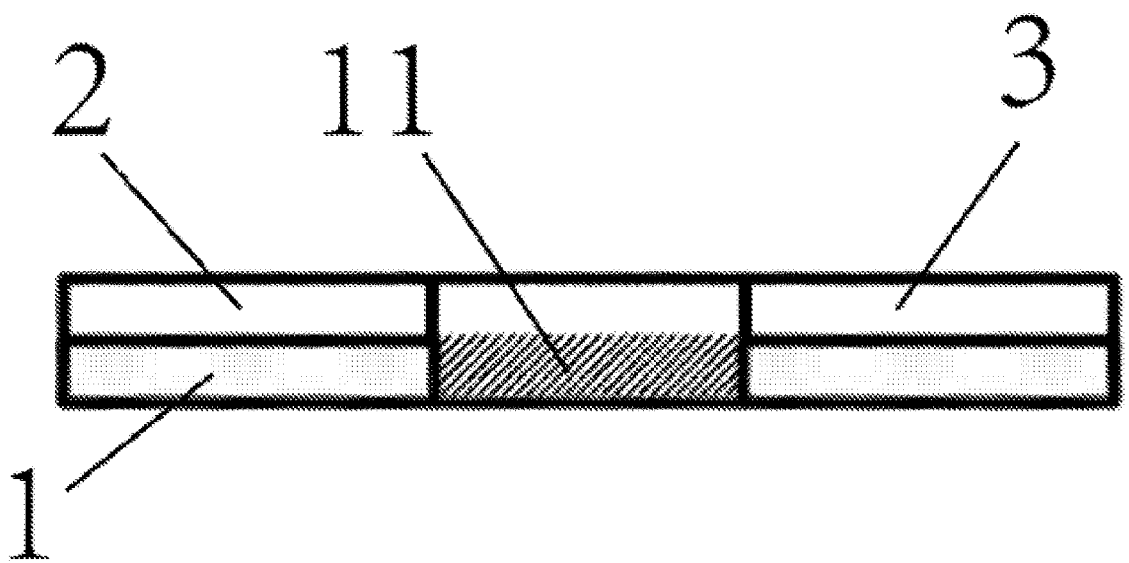
FIG. 4 is a top view of a screen component provided by some embodiments of the disclosure (the screen body is arranged in the first position).

Please refer to FIG. 3, while the screen body 1 is arranged in the first position, the presentation area 11 is located within a range of the window, and the front-mounted mechanism is able to expose from the presentation area 11.

Please refer to FIG. 1, while the screen body 1 is arranged in the second position, the screen body 1 takes up the window, and the front-mounted mechanism is shielded by the screen body 1.

In some embodiments, the mobile device includes a mobile phone, the front-mounted mechanism includes a front-mounted camera, and the front-mounted camera is located within the range of the window.

In real life, while a user uses the mobile phone, the front-mounted camera is not always in use, and even most of the time, the front-mounted camera is not in working state. While the mobile phone provided with the screen component provided in some embodiments is in use, the screen body 1 is controlled to switch between the first position and the second position according to requirements. The mobile phone only exposes the front-mounted camera while it needs to use the front-mounted camera. While the front-mounted camera is not used, the front-mounted camera is shielded by the screen body 1, so that the screen body 1 takes up the window, and the screen-to-body ratio reaches the highest.

In some embodiments, while the front-mounted mechanism is not needed to be used, the screen body 1 is controlled to be in the second position, and the presentation area 11 is located outside the range of the window. At this time, the front-mounted mechanism is located behind the screen body 1 and is shielded, and the user may not observe the front-mounted mechanism. The screen body 1 fills the window of the mobile device, and an entire window is a screen display area, so the screen-to-body ratio of the mobile device reaches the highest.

While the front-mounted mechanism needs to be used, the screen body 1 is controlled to be moved to the first position. The presentation area 11 of the screen body 1 is moved to the window and corresponds to the position of the front-mounted mechanism. At this time, the user observes the front-mounted mechanism from the presentation area 11, and the front-mounted mechanism works normally.

While the screen body 1 is arranged in the first position, a part of the window of the mobile device is occupied by the presentation area 11 and the front-mounted mechanism. Therefore, the screen-to-body ratio is decreased compared to the screen-to-body ratio while the screen body 1 is arranged in the second position. However, because the front-mounted mechanism is not shielded at this time, the front-mounted mechanism may work normally.

It may be seen that the mobile device using the screen component provided in some embodiments may change the screen-to-body ratio of the mobile device through controlling the screen body 1 to switch between the first position and the second position while in use, and the front-mounted mechanism needs to be used, the normal working of the front-mounted mechanism may not be affected. The user is able to switch the screen-to-body ratio of the mobile device according to the requirements, so the user experience is greatly improved.

At the same time, because the screen takes up the entire window while the screen body 1 is arranged in the second position, the problem of the "notch"-type design that reduces the aesthetic degree is avoided. At the same time, there is no need to punch a hole on the screen.

In actual applications, the screen body 1 adopts a traditional rigid screen or a flexible screen. While the rigid screen is used, a movement mode of the screen body 1 is a translational movement. In some embodiments, while the flexible screen is used, the screen body 1 is moved in a translational mode, or moved in a mode such as bending or winding.

Please refer to FIG. 1-FIG. 4. In some embodiments of the disclosure, the screen body 1 includes a flexible screen. The flexible screen is used as the screen body 1. In some embodiments, the screen body 1 is moved by using the winding or bending mode. Compared with the translational movement mode, the occupied space is smaller, and the overall volume of the mobile device is avoided from being too large.

Please refer to FIG. 1-FIG. 4. In some embodiments of the disclosure, the flexible screen has a first end and a second end which are provided oppositely, and the first end and the second end of the flexible screen are both wound on the driving mechanism. Both ends of the flexible screen are wound on the driving mechanism, and the flexible screen as a whole presents a shape similar to a transmission belt. The flexible screen is wound in the direction towards the first end or the second end, it is achieved that the flexible screen is moved relative to the window, and the movement mode of winding the end does not need to reserve other space in the mobile device for the movement of the flexible screen, so an overall volume of the mobile device is avoided from being too large.

Please refer to FIG. 1-FIG. 4, in some embodiments of the disclosure, the presentation area 11 is disposed in a middle position of the first end, and correspondingly, the front-mounted mechanism is also disposed in the middle position of the window end. The driving mechanism includes a first rotating shaft 2, a second rotating shaft 3 and a third rotating shaft 4. The first end of the flexible screen is wound on the first rotating shaft 2 and the second rotating shaft 3, and the first rotating shaft 2 and the second rotating shaft 3 are disposed coaxially, and are respectively located on both sides of the presentation area 11. The second end of the flexible screen is wound on the third rotating shaft 4.

While in use, a movement of the flexible screen is realized through controlling the rotation of the first rotating shaft 2, the second rotating shaft 3 and the third rotating shaft 4. While the flexible screen is arranged in the first position, the first end of the flexible screen is located within the range of the window, and the presentation area 11 is located in front of the front-mounted mechanism, and the front-mounted mechanism is exposed. At this time, the second end of the flexible screen is wound on the third rotating shaft, namely a part of the second end of the flexible screen is located outside the range of the window and may not be observed. While the flexible screen needs to be switched from the first position to the second position, the first rotating shaft 2, the second rotating shaft 3 and the third rotating shaft 4 are rotated synchronously and in the same direction, so that the first end of the flexible screen is wound on the first rotating shaft 2 and the second rotating shaft 3, the first end and the presentation area 11 are wound, and the presentation area 11 and the screen areas on both sides of the presentation area 11 are rotated to the rear, depart from the presentation range of the window, and shield the front-mounted mechanism. At the same time, a part previously wound on the third rotating shaft 4 is unfolded, and enters the window area. While it is switched to the first position, the operation is just reversely performed.

In some embodiments of the disclosure, the presentation area 11 includes a gap or a transparent layer.

While the presentation area 11 is arranged as the gap, because there is no physical structure at the gap, while the flexible screen is arranged in the first position, the front of the front-mounted mechanism is not shielded, and the light transmission effect is better.

While the presentation area 11 is arranged as the transparent layer, a transparent material may be used for the transparent layer. While in use, the transparent layer may physically shield the front-mounted component, and under the premise of ensuring the normal working of the front-mounted component, it may protect the front-mounted component from damage due to impacts and the like, and has the better dust-proof effect.

In some embodiments of the disclosure, a mobile phone is also provided, and the mobile phone includes the above screen component.

In some embodiments of the disclosure, a mobile device is also provided, and the mobile device includes the above screen component.

The above are only a part of the implementation modes of the disclosure, and are not intended to limit the disclosure. For those skilled in the art, the disclosure contains various modifications and changes. Any modifications, equivalent replacements, improvements and the like made within the spirit and principle of the disclosure shall be included in a scope of protection of the disclosure.

What is claimed is:

1. A screen component, disposed on a window of a mobile device, and a front-mounted mechanism is disposed in the window of the mobile device, comprising:
   a screen body, wherein an end of the screen body is provided with a presentation area;
   a driving mechanism, wherein the driving mechanism is configured to drive the screen body to switch between a first position and a second position;

while the screen body is arranged in the first position, the presentation area is located within a range of the window, and the front-mounted mechanism is able to expose from the presentation area; and while the screen body is arranged in the second position, the screen body fills the window, and the front-mounted mechanism is shielded by the screen body;

wherein the screen body comprises a flexible screen, the flexible screen has a first end and a second end which are provided oppositely, and the first end and the second end of the flexible screen are both wound on the driving mechanism; the presentation area is disposed in a middle position of the first end;

wherein the driving mechanism comprises a first rotating shaft, a second rotating shaft, and a third rotating shaft, wherein the first end of the flexible screen is wound on the first rotating shaft and the second rotating shaft, and the first rotating shaft and the second rotating shaft are disposed coaxially and are respectively located on two sides of the presentation area; and the second end of the flexible screen is wound on the third rotating shaft.

2. The screen component as claimed in claim 1, wherein the presentation area comprises a gap.

3. The screen component as claimed in claim 1, wherein the presentation area comprises a transparent layer.

4. A mobile phone, wherein the mobile phone comprises the screen component as claimed in claim 1.

5. The mobile phone as claimed in claim 4, wherein the presentation area comprises a gap.

6. The mobile phone as claimed in claim 4, wherein the presentation area comprises a transparent layer.

7. A mobile device, wherein the mobile device comprises the screen component as claimed in claim 1.

8. The mobile device as claimed in claim 7, wherein the presentation area comprises a gap.

* * * * *